United States Patent [19]
Shover

[11] Patent Number: 5,463,985
[45] Date of Patent: Nov. 7, 1995

[54] PROTECTIVE GARMENT FOR FEMALE CANINES

[76] Inventor: Stephanie A. Shover, 5231 NW. 53rd Ave., Coconut Creek, Fla. 33073

[21] Appl. No.: 376,289

[22] Filed: Jan. 23, 1995

Related U.S. Application Data

[63] Continuation of Ser. No. 52,652, Apr. 26, 1993, abandoned.

[51] Int. Cl.⁶ .......................... A01K 29/00; A01K 13/00
[52] U.S. Cl. .............................................. 119/850; 54/79.2
[58] Field of Search ............................ 119/95, 850, 854; 54/79.1, 79.2, 79.4

[56] References Cited

U.S. PATENT DOCUMENTS

| | | | |
|---|---|---|---|
| 2,222,705 | 11/1940 | Conlon | 54/79.1 |
| 2,443,831 | 6/1948 | Miller | 54/79.1 |
| 3,211,132 | 10/1965 | Hersh | 119/143 |
| 4,527,991 | 7/1985 | Msarsa | 119/95 X |
| 4,577,591 | 3/1986 | Wesseldine | 119/143 |
| 4,917,683 | 4/1990 | Thompson | 119/95 X |
| 5,271,211 | 12/1993 | Newman | 54/79.2 |

FOREIGN PATENT DOCUMENTS 7411737  3/1976  Netherlands ............................. 119/95

Primary Examiner—Robert P. Swiatek
Attorney, Agent, or Firm—Malin, Haley, DiMaggio & Crosby

[57] ABSTRACT

Protective apparel worn by animals, such as female dogs, for protecting the surrounding environment from body secretions, such as when the animal is in heat, having an absorption pad supported by a removable panel that eliminates the need for removing the garment when the animal has to relieve itself and elastic-type bands sewn in at the neck, waist, and legs to restrain the garment and to prevent its easy removal by the animal.

4 Claims, 3 Drawing Sheets

PROTECTIVE GARMENT FOR FEMALE CANINES

This application is a divisional, of application Ser. No. 08/052,652, filed Apr. 26, 1993, now abandoned.

BACKGROUND OF THE INVENTION

1. Field of the Invention

This invention relates generally to protective and decorative apparel that are worn by animals, such as female dogs, and in particular, to apparel that cannot be displaced or removed by the animal and that protects the surrounding environment from fluids discharged by the animal in the genital area.

2. Description of the Prior Art

Female animals in heat, such as dogs, often secrete body fluids that can stain carpeting, tarnish furniture, or blemish floor areas. Likewise, male as well as female animals can ruin the surrounding environment just by making normal bodily deposits. Pet owners often utilize apparel to dress up their animals in clothing to give a human-like appearance, but such garments are insufficient to retain their pet's secretions. For instance, fully enclosed garments are capable of receiving pads, however, they do not permit the animal to relieve itself without complete removal. On the other hand, some garments have openings to permit discharge, but do not permit the placement of a pad. Hence, it is virtually impossible to control bodily secretions while conveniently allowing a pet to relieve itself with conventional animal apparel, as pants either completely cover the animal's legs and torso, inhibiting discharge, or contain openings insufficient for supporting absorption pads.

An additional problem with typical animal clothing is that it may be displaced or removed by the animal rubbing, scratching, or biting the garment. Pet owners find this annoying in that they commonly dress their pets in clothing to accord with fashion, to cover their skin so that it will not be licked when a therapeutic ointment is administered, or to prevent further skin abrasions from the animal gnawing at fleas or skin irritations. In any event, removal of clothing by the animal is annoying and potentially worrisome for the owner, and almost impossible to prevent without constant and continual supervision.

The present invention overcomes problems of the prior apparel by providing garments for animals that include a removable, but replaceable segment that can be removed to allow the animal to perform its normal bodily functions. In another mode, the apparel can be used to support protective padding that absorbs the secretions made by an animal such as a bitch in heat. Additionally, the instant device introduces animal clothing that under normal circumstances securedly remains on the animal, preventing its removal by the same.

SUMMARY OF THE INVENTION

The present invention contemplates a garment, particularly sized and adapted for use by an animal, typically a female canine, comprising a torso encircling portion and a leg encircling portion. The torso encircling portion covers the torso of the animal from the waist back and may include an elastic band at the waist opening to engage around said waist. The leg portions are cylindrical tubular sections that circumscribe the legs. The leg portions and torso engaging portion connect together, leaving a large opening in the rear area of the garment to permit the animal to perform normal bodily functions such as urinating and defecating.

A plurality of fastening means are disposed and connected to the torso section, to the leg portions, and to a fabric panel in strategically aligned positions so that the panel can be mounted on the garment itself. The fabric panel completely covers the rear portion, leaving room for the tail of the animal and is sized to receive an absorption pad that is used with female canines to absorb bodily secretions such as when the animal is in heat.

Thus, the garment described to this point functions in two modes. In a first mode, the panel is removed to allow the animal to relieve itself, and in a second mode the panel is firmly attached to the remaining garment by fabric fasteners. The panel may maintain the same color and fabric as the remaining portions of the garment so that it appears to be a uniform pair of pants for the animal.

In the preferred embodiment, the panel would include Velcro fasteners, one at each corner. The garments themselves obviously would be sized to fit a particular range of animals, from very small dogs to very large dogs.

To operate this aspect of the invention, the pet owner attaches the absorbing pad to the panel section and fastens the panel to the garment. Periodically, the absorption pad will obviously have to be changed. At those times when the animal needs to relieve itself, the panel is removed, allowing the animal to perform bodily functions without damaging the garment or necessitating its complete removal. The pant garment is placed on the animal in a normal manner, wherein the animal's legs are inserted through the pant legs and the waist band is pulled up to encircle the rear torso of the animal.

The instant invention also introduces a garment that is not, under normal circumstances, removable by an animal, further comprising a chest portion, a rear encircling portion, and full leg portions. The chest portion encircles and covers the animal's chest and back, and provides an opening at the neck and waist. The neck aperture and first waist aperture both contain elastic or elastic-type supports around their lateral edges.

The rear portion covers the animal's hind end area and provides openings for the waist and tail. The waist aperture contains an elastic means around its lateral edge to prevent the easy removal of the garment while the tail aperture provides an opening sufficient to accommodate an animal's tail.

The full leg portions comprise full pant legs with openings for the paws. Like the other apparatus, the paw apertures have elastic or elastic-like bands sewn therein to securely engage the animal's legs just above the paw. Full pant legs are preferably sewn to the rear portion and the chest portion to cover the rear and front legs respectively and securely engage the animal by elastic means such that the garments may not be removed under normal circumstances by the animal rubbing, scratching, or biting them. The elastic supports secure the apparel to the animal, preventing its easy removal to insure the dog remains covered.

It is an object of this invention to provide an improved garment for a female canine to provide an absorption pad for use in preventing the secretion of body fluids into the ambient environment, such as when the animal is in heat.

It is another object of this invention to provide a novel animal garment that can still be worn as pants, while having a removable panel that allows the animal to relieve itself when necessary.

It is another object of this invention to have a decorative garment for an animal that includes a removable panel to allow the animal to relieve itself.

In accordance with these and other objects which will be apparent hereinafter, the instant invention will now become described with particular reference to the accompanying drawings.

DESCRIPTION OF THE PREFERRED EMBODIMENTS

Figure 1:
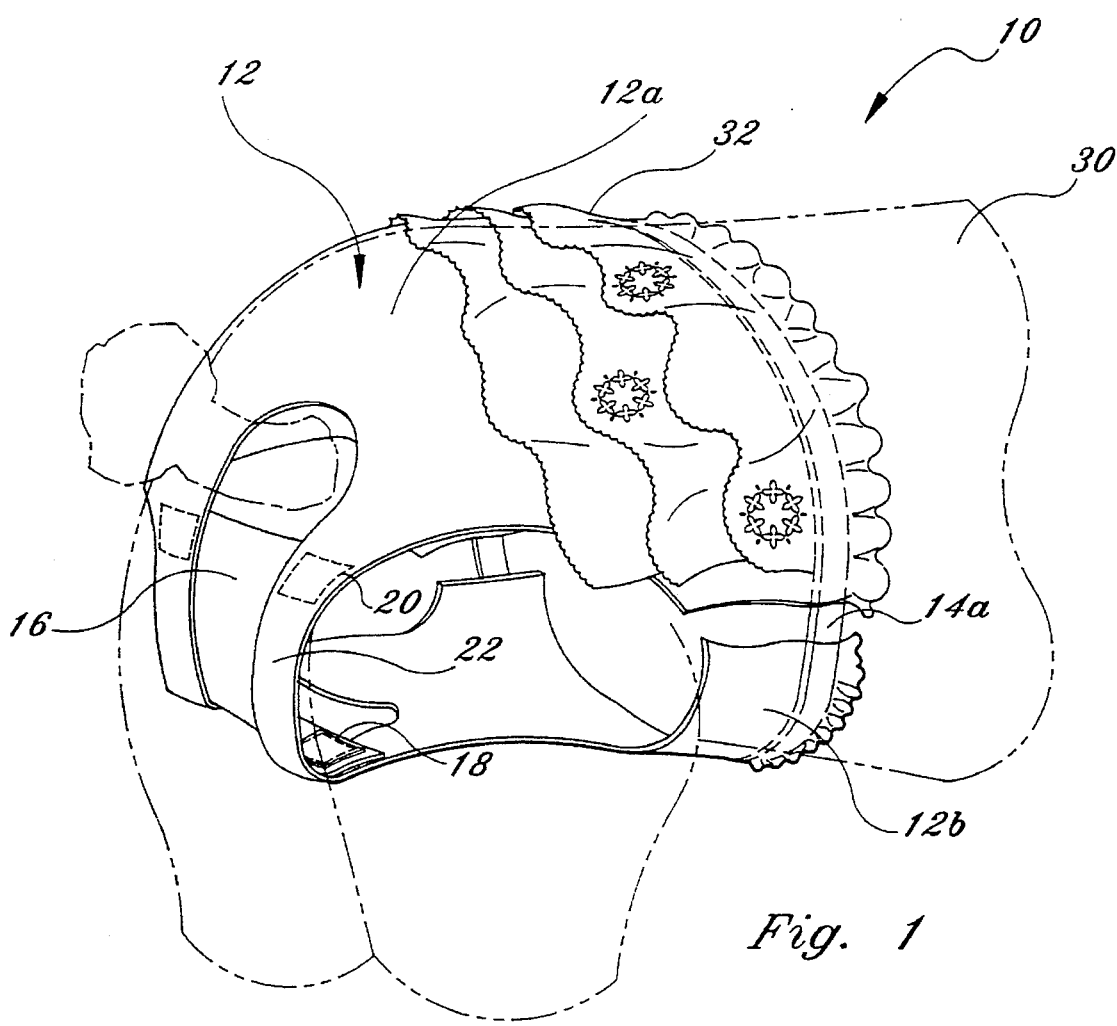
FIG. 1 shows a perspective view of a garment in accordance with Applicant's invention with a dotted portion showing the rear torso of a canine.

Referring now to the drawings, and in particular to FIG. 1, the present invention 10, shown mounted on the rear of a typical female canine 30, is comprised of an animal garment 12 made of a suitable fabric such as cotton or any other synthetic or natural fiber. It includes an elastic waist band 14 which is shown cut away, 14a, but is in fact encircled completely, wherein it restrains the garment around the midsection or torso of the animal 30. The animal garment 12 includes a top torso portion 12a, a bottom torso portion 12b, and a decorative skirt portion 32 around the waist area to act like a skirt, all of which are sewn together as a complete unit. The garment also includes continuous fabric straps 22, which are sized to encircle the legs of the animal, one on each side. Each fabric strap 22 includes fabric fastener patches 20 strategically located and which are attached firmly to the garment 12.

A removable fabric panel 16 is sized to fit in the genital area of the animal so that it can hold an absorption pad that is used to absorb body fluids secreted by the animal 30 such as when the animal 30 is in heat. The absorption pad 34 may be a typical type of feminine hygiene absorption pad purchased from a grocery store or suitable absorbing pad material that fits comfortably inside the panel 16 when placed as shown in FIG. 1. Typical pads 34 may have adhesive backings to secure the pad 34 inside a garment.

Figure 2:
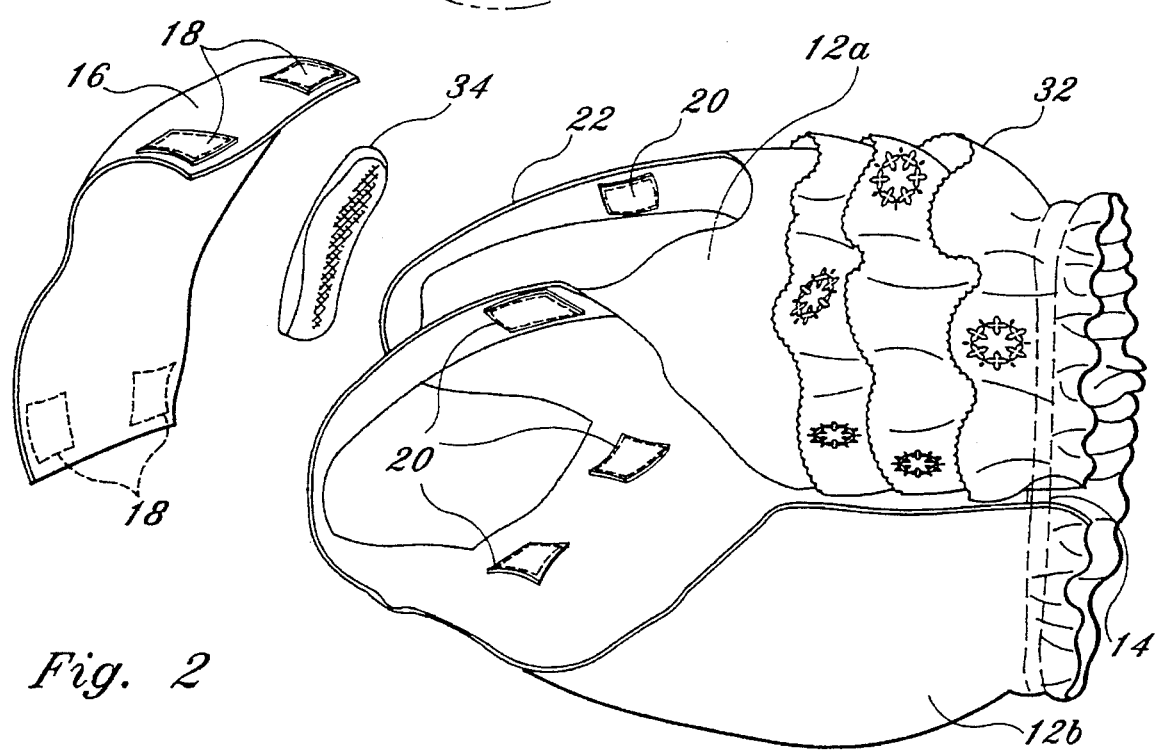
FIG. 2 shows an exploded view in perspective of the garment in accordance with the invention, with the rear panel exploded.

FIG. 2 shows the panel 16 removed and the fabric fasteners 18 attached at each corner such that all four fabric fasteners 18 engage the corresponding fabric fastener patches 20, located on the straps 22 of animal garment 12. As shown in FIG. 2, the absorbing pad 34 fits inside the removable panel 16. For cost purposes, the fabric panel 16 is styled in a generic color and fabric that blends with the fabric to permit utilization with other animal garments with a rear aperture 12. The animal garment can also include a decorative skirt 32, which mounts completely around the animal garment 12 to provide styled clothing for the animal, similar to the appearance of a tennis skirt.

To operate this aspect of the device when the animal is secreting bodily fluids, for instance, during heat, panel 16 is attached to the animal garment 12 by fabric fasteners 18 and fabric fastener patches 20 while supporting the pad 34, as shown in FIG. 1. In this position, with the pad 34 in place, an animal may secrete body fluids from the genital area without making deposits on the floor, furniture, carpeting, or the like. Periodically, the panel 16 may be removed to replace the pad 34. At times when the animal signals the owner that it needs to relieve itself, the owner merely removes the panel 16 and lets the dog outside to conduct its business. Once the animal is finished, the owner may quickly and easily reinstall the panel 16 with attached pad 34 to its original position on the garment 12.

To install the garment 12 on a canine 30, the waistband 14 is pulled around the legs and over the torso, with the legs being inserted in each of the strap portions. The garment 12 may be secured further with an elastic band 14a sewn into the waistband 14. Although the invention is shown preferably for female canines, the invention may be utilized for male canines and other animals.

Figure 3:
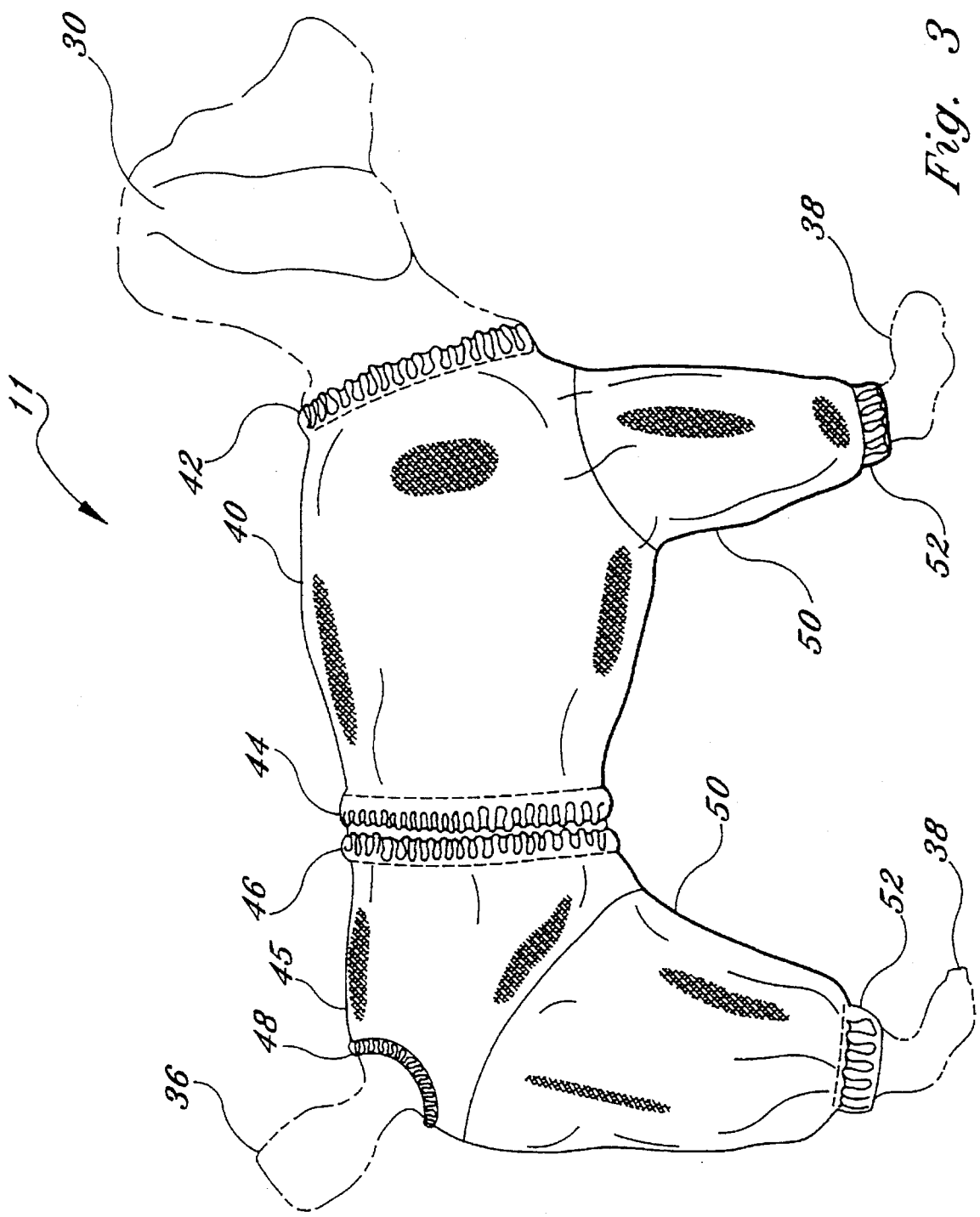
FIG. 3 shows a perspective view of a garment in accordance with the Applicant's invention, illustrating the body portion, rear portion, and leg portions worn by an animal.

Referring now to FIG. 3, the present invention 11 is shown in an alternative embodiment as a body garment, comprising the body portion 40, the rear portion 45, and a plurality of leg portions 50. The chest portion 40 comprises a neck aperture 42 and a first waist aperture 44, wherein both said apertures contain an elastic or elastic-type band around their lateral edges to secure the clothing around the neck and waist, respectively, of the dog 30. The rear portion 45, having a second waist aperture 46 and a tail aperture 48, covers the rear portion of the dog 30. Second waist aperture 46 contains an elastic or elastic-type encircling band to secure the rear portion 45 to the rear end of the dog 30. The tail aperture 48 receives the tail 36 and is securedly sewn to prevent fraying of the material. Leg portions 50 covering the front legs are connected to the chest portion 40 and leg portions 50 covering the hind legs are connected to the rear portion 45 and all contain paw apertures 52, wherein said paw apertures 52 also maintain an elastic or elastic-type band to securedly engage the leg of the dog 30 just above the paw 38.

Figure 4:
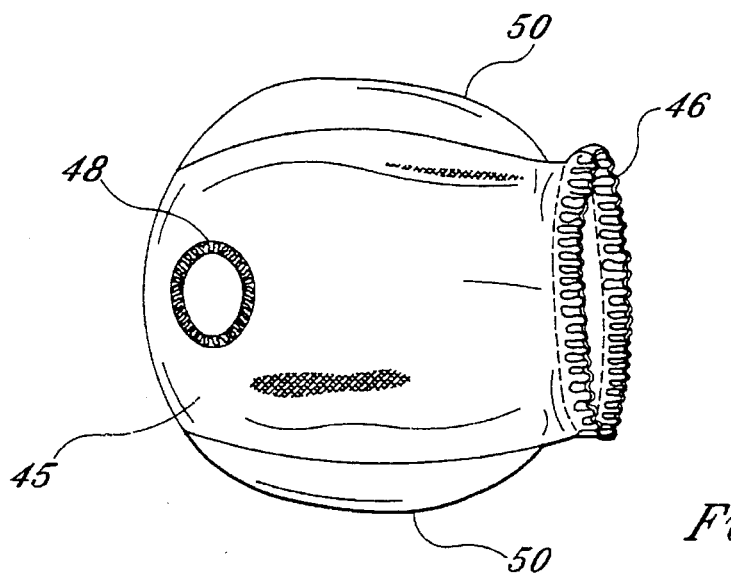
FIG. 4 shows a plan view of the rear portion of the garment, illustrating the second waist aperture and the tail aperture.
Figure 5:
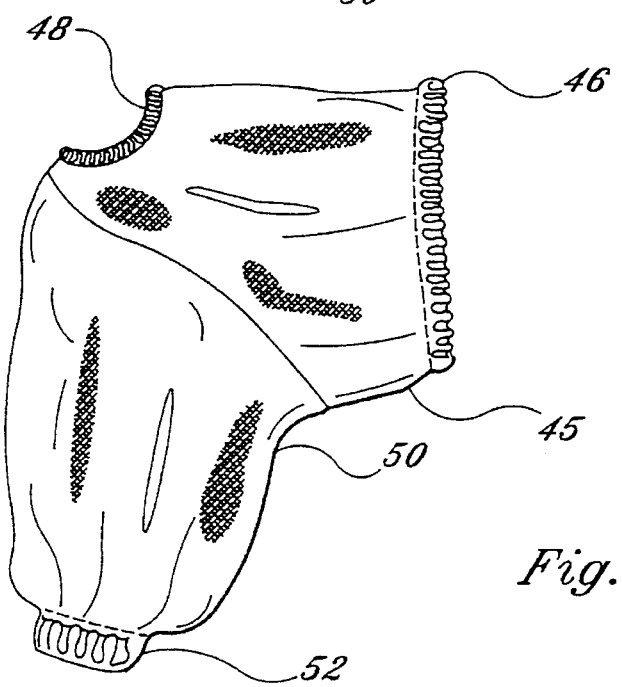
FIG. 5 shows a side view of the rear portion connected to a leg portion, illustrating the second waist aperture, the tail aperture, and the paw aperture.
Figure 6:
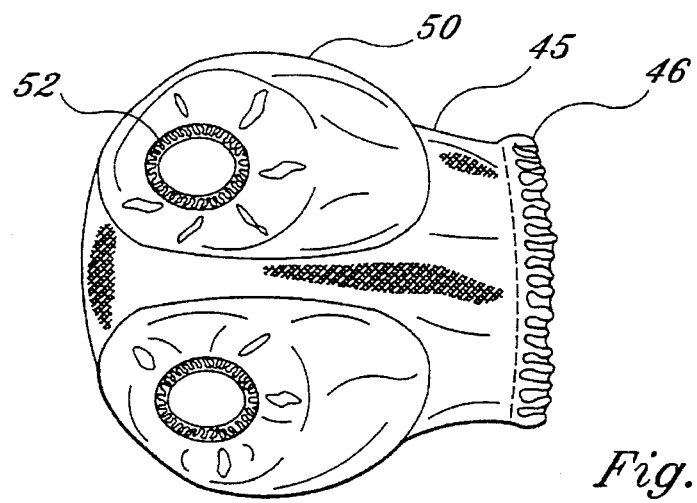
FIG. 6 shows a bottom view of the rear portion of the instant invention connected to leg portions, illustrating two paw apertures and the rear waist aperture.

The rear portion 45 is shown in FIG. 4 from a plan view, illustrating the second waist aperture 46, which utilizes an elastic or elastic-type band around its lateral edge. As seen in FIG. 5, a leg portion 50 of the plurality of leg portions 50 is connected to the rear portion 45 such that the leg portion 50 pends downward therefrom, ending with a paw aperture 52. Once again, elastic or elastic-type bands are shown secured to second waist aperture 46 and paw aperture 52 to restrain the garment to the dog. A bottom view of the rear section 45 is provided in FIG. 6, illustrating the relative positions of paw apertures 52, leg portion 50, and waist aperture 46.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A garment for a canine or other animal, sized and shaped to fit around the body and legs of an animal, comprising:

a body encircling portion for completely covering the animal's torso or body;

a rear portion for completely covering the animal's rear torso, said rear portion being adjacent to and abutting said body encircling portion when both said rear and body portions are worn;

a plurality of leg portions coupled to said body encircling portion and coupled to said rear portion for covering the animal's front legs and back legs, respectively;

said body-encircling portion including a neck aperture and a first waist aperture, said rear portion including a second waist aperture and a tail aperture, wherein said second waist aperture of said rear portion and said first waist aperture of said body encircling portion are adjacent at the waist when said portions are worn;

said plurality of leg portions each including a paw aperture;

a neck securing means coupled to said neck aperture of said body encircling portion for securing said garment to the animal's neck;

a waist securing means coupled to said first waist aperture of said body encircling portion for securing said body portion to the animal's waist;

a waist securing means coupled to said second waist aperture of said rear portion for securing said rear portion to the waist of the animal; and a leg securing means coupled to said paw apertures for securing said plurality of leg portions to the animal's legs.

2. A garment as in claim 1, wherein said neck securing means comprises an elastic or elastic-type band.

3. A garment as in claim 1, wherein said leg securing means comprises an elastic or elastic-type band.

4. A garment as in claim 1, wherein said waist securing means comprises an elastic or elastic-type band.

\* \* \* \* \*